United States Patent [19]

Petty

[11] 4,199,926
[45] Apr. 29, 1980

[54] GRASS CUTTER AND MULCHER FOR ROTARY LAWN MOWER

[76] Inventor: Richard H. Petty, 8106 Braeburn Ter. #3G, Indianapolis, Ind. 46219

[21] Appl. No.: 952,689

[22] Filed: Oct. 19, 1978

[51] Int. Cl.² ............................................. A01D 55/18
[52] U.S. Cl. ...................................... 56/295; 56/12.7
[58] Field of Search ................... 56/295, 12.7, 364; 30/276

[56] References Cited

U.S. PATENT DOCUMENTS

| 2,663,137 | 12/1953 | Asbury | 56/295 |
| 2,987,866 | 6/1961 | Ferris | 56/12.7 |
| 3,014,333 | 12/1961 | Clark, Jr. | 56/295 |
| 3,018,602 | 1/1962 | Diesterweg | 56/295 |
| 3,203,161 | 8/1965 | Breisch et al. | 56/295 |
| 3,208,209 | 9/1965 | Dunlap et al. | 56/295 |
| 3,303,637 | 2/1967 | Wixson | 56/295 |
| 3,444,674 | 5/1969 | Huff et al. | 56/295 |
| 3,859,777 | 1/1975 | Doering | 56/295 |
| 4,065,913 | 1/1978 | Fisher et al. | 56/295 |
| 4,126,990 | 11/1978 | Fisher | 56/295 |

FOREIGN PATENT DOCUMENTS

| 2422651 | 12/1974 | Fed. Rep. of Germany | 56/295 |
| 2352238 | 4/1975 | Fed. Rep. of Germany | 56/295 |
| 1058467 | 11/1953 | France | 56/295 |

Primary Examiner—Jay N. Eskovitz
Attorney, Agent, or Firm—Woodard, Weikart, Emhardt & Naughton

[57] ABSTRACT

A grass cutter and mulcher for a rotary lawn mower. A flat disc is mounted to the output drive shaft of a rotary lawn mower. A plurality of flexible rods are cantileveredly mounted to the disc and extend outwardly therefrom to cut grass as the disc is rotated by the mower. The rods are arranged in a nonradial direction and extend in an advancing manner preceding the direction of disc rotation to provide a slicing cut force upon the grass and an inwardly directed force upon the cut grass to limit the outward movement of the grass. A plurality of slots in the disc are aligned with the rods allowing insertion and removal of the rods.

9 Claims, 8 Drawing Figures

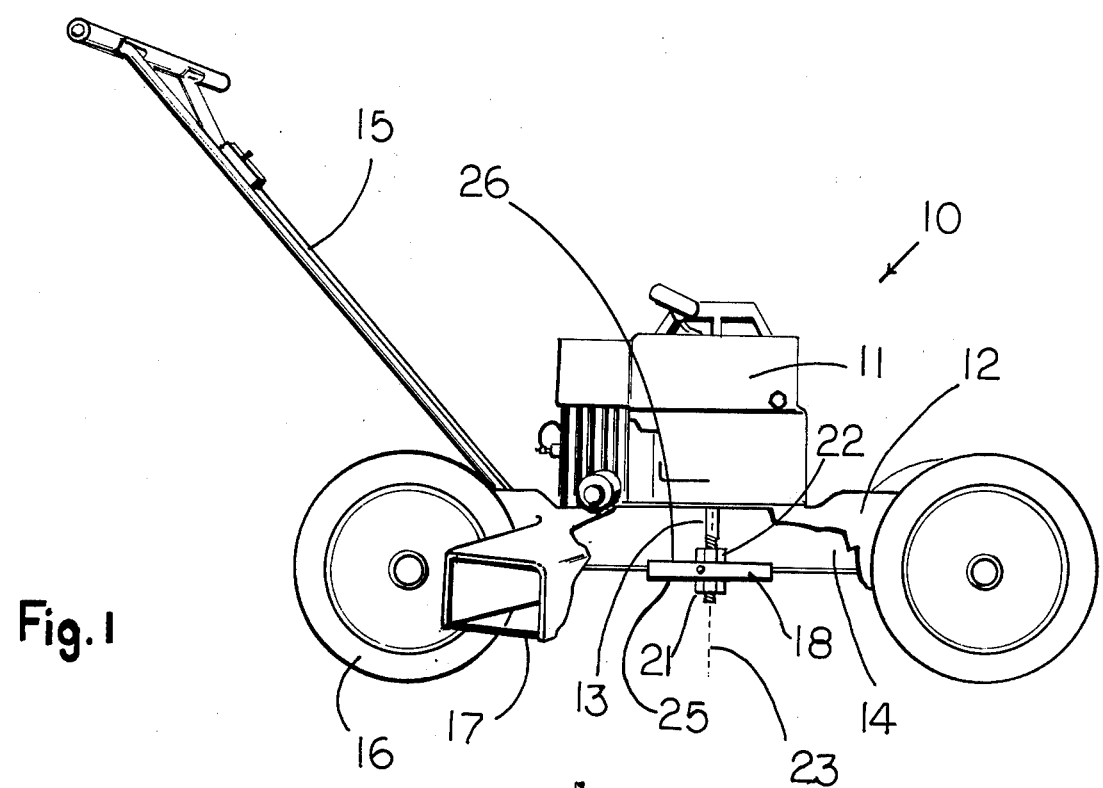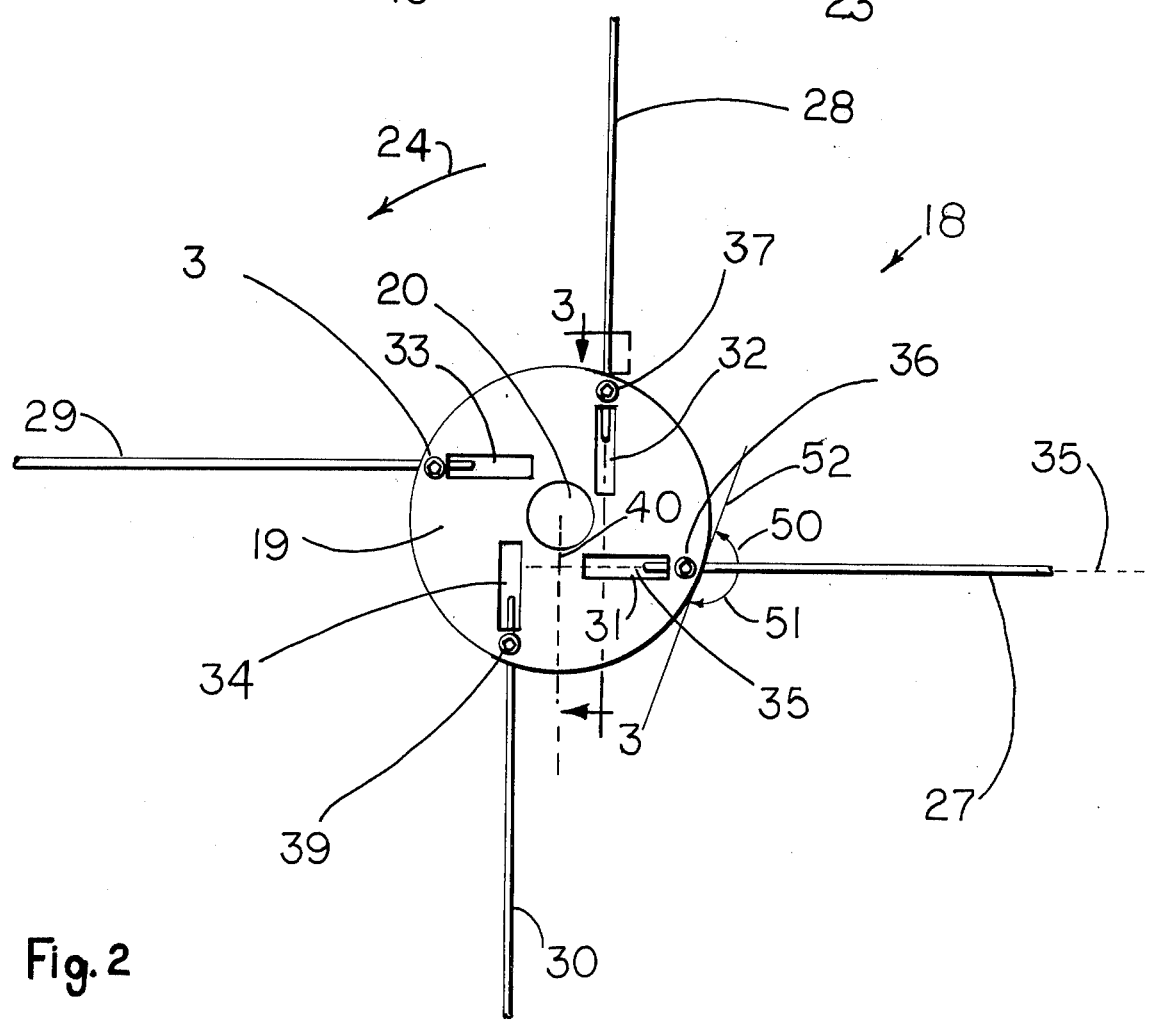

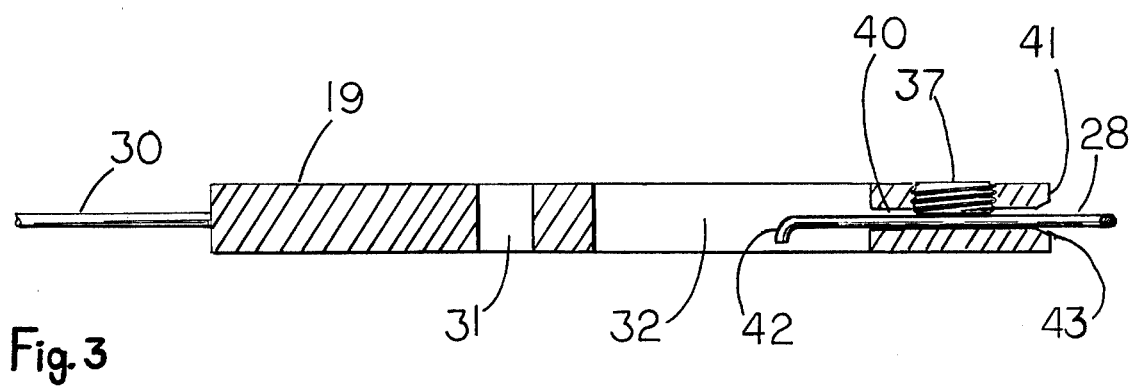
Fig. 3
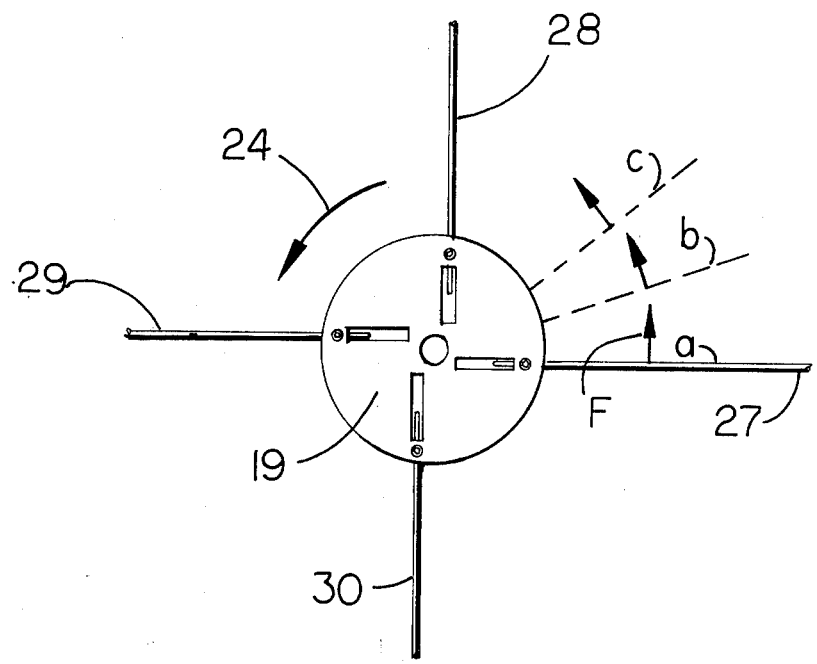
Fig. 4
Fig. 4a  Fig. 4b  Fig. 4c
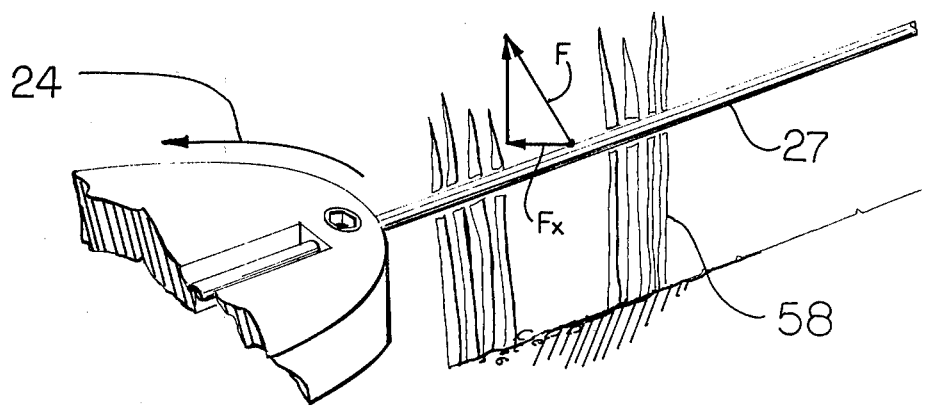
Fig. 5

GRASS CUTTER AND MULCHER FOR ROTARY LAWN MOWER

BACKGROUND OF THE INVENTION

This invention is in the field of rotary lawn mowers having safety blades and mulchers. A number of patents have been granted on rotary lawn mowers and particularly have been directed to flexible rod blades which will cut the grass while at the same time not break on impact with an object such as a rock. For example, in the U.S. Pat. No. 4,065,913, a rotary lawn mower is disclosed having a rotatable disc with a plurality of radially extending rods. A somewhat similar device is shown in U.S. Pat. No. 3,303,637 wherein the rods are attached to the output drive shaft of the motor with the rods being in a closed loop configuration. Another patent disclosing a closed looped rod configuration for a rotary lawn mower is the U.S. Pat. No. 3,208,209 which also discloses alternate embodiments including radially extending rods. The cutting rods used in the prior art devices typically are flexible in order to prevent breakage of the rod when impacting an immovable object. For example, the U.S. Pat. No. 3,444,674 discloses rods which bend backward upon operation adjacent to a barb wire fence. In lieu of utilizing flexible rods, some rotary lawn mowers have been provided with pivoting blades such as shown in the U.S. Pat. No. 3,203,161.

Disclosed herein is a new and improved rotary lawn mower having rotating cutting rods which extend outwardly in a nonradial direction in contrast to the prior cutters having rods extending in a radial direction. Several advantages result by arranging the cutting rods to extend in a nonradial direction relative to the axis of rotation. First, the rod impacts the upstanding grass at such an angle so as to provide a slicing cut in lieu of the straight-through cut existing in the prior cutters. Further, an inwardly directed force is applied to the cut grass so as to limit the normal outward flow of the grass thereby insuring that the grass is impacted by subsequent cutting rods. Further advantages include the low cost of the structure disclosed herein as compared to the prior devices and the fact that the structure disclosed herein may be easily repaired by the simple removal and reinsertion of new cutting rods.

SUMMARY OF THE INVENTION

One embodiment of the present invention is a grass cutter and mulcher for a rotary lawn mower having a rotatable output drive shaft comprising a main body operatively associated with the shaft and rotatable therewith in a circular direction about an axis of rotation, a plurality of flexible rods mountable fixedly to the main body to extend outwardly therefrom in a nonradial direction relative to the axis to provide a slicing cut force upon initial impact with upstanding grass and with the force including an inwardly directed force component, each of the rods having a main portion located outwardly of the main body advancing toward the circular direction to provide an inwardly directed force vector on the upstanding grass reducing outward movement of cut grass and to allow following rods to contact and mulch the cut grass.

It is an object of the present invention to provide a new and improved cutting and mulching device for use with a rotary lawn mower.

A further object of the present invention is to provide a grass cutter providing a slicing cut force upon initial impact with upstanding grass.

Yet another object of the present invention is to provide a grass cutter and mulcher wherein the outward movement of the cut grass is limited so as to be impacted by following cutting rods.

Related objects and advantages of the present invention will be apparent from the following description.

BRIEF DESCRIPTION OF THE DRAWINGS

FIG. 1 is a fragmentary side view of a lawn mower incorporating the present invention.

FIG. 2 is an enlarged bottom view of the grass cutter and mulcher installed on the mower shown in FIG. 1.

FIG. 3 is a cross-sectional view taken along line 3—3 of FIG. 2 and viewed in the direction of the arrows.

FIG. 4 is the same view as FIG. 2 only on a reduced scale and showing subsequent positions of one of the cutting rods.

FIG. 4a is a force vector diagram for rod position a of FIG. 4.

FIG. 4b is a force vector diagram for rod position b of FIG. 4.

FIG. 4c is a force vector diagram for rod position c of FIG. 4.

FIG. 5 is a schematic view of one of the cutting rods impacting upstanding grass.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a rotary lawn mower 10 of conventional design except for the grass cutter and mulcher to be described subsequently herein. Lawn mower 10 includes a conventional engine or motor 11 mounted upon frame 12 and having a rotatable output drive shaft 13 extending into the grass cutting cavity 14 formed by frame 12. A handle 15 is attached to frame 12 in a conventional manner along with conventional wheels 16. Frame 12 is provided with a standard grass dispersion unit 17 through which the cut grass exits onto the lawn or into a catch bag not shown in the drawing. A grass cutter and mulcher 18 is mounted to drive shaft 13.

A bottom enlarged view of the grass cutter and mulcher 18 is shown in FIG. 2 and includes a main body 19 having a central aperture 20 through which the drive shaft 13 extends. Main body 19 may be attached to the drive shaft in a number of different ways. For example, drive shaft 13 may extend completely through aperture 20 with a pair of hexagonally shaped nuts or fastening devices 21 and 22 (FIG. 1) fixedly securing main body 19 to the drive shaft 13 and preventing relative motion therebetween. The axis of rotation of shaft 13 is shown as axis 23 in FIG. 1. Main body 19 can therefore be said to be operatively associated with shaft 13 with the main body 19 and shaft 13 rotating in a circular direction about axis 23. Main body 19 rotates in the direction of arrow 24 shown in FIGS. 2, 4 and 5.

A variety of configurations may be used for main body 19. In the drawings, main body 19 is shown as having a flat disc configuration with a horizontal bottom surface 25 and a horizontal top surface 26. A plurality of flexible rods 27, 28, 29 and 30 (FIG. 2) are cantileveredly mounted to main body 19 and are located equidistant between the top and bottom surfaces 25 and 26 of the disc. While although the main body is shown in the drawings as having four rods, it is to be understood that the number of rods may be greater than, equal to or less than four rods. For operation of the present invention, the main body must be provided with at least two rods in order to achieve satisfactory mulching of the grass.

The rods are flexible and may be produced from metal. In one embodiment, the rods were produced from 1/16 inch diameter music wire having a constant circular cross section throughout the length of the wire. The rods extend through passages within main body 19 and are secured in cantilever fashion by set screws.

Main body 19 includes a plurality of slots 31, 32, 33 and 34 which extend through main body 19 and being aligned respectively with the longitudinal axis of rods 27, 28, 29 and 30. For example, the longitudinal axis 35 of rod 27 extends centrally through the rod and then through slot 31. A separate passage extends from each slot 31–34 to the outer circumference of disc or main body 19 in order that rods 27–30 may extend therethrough with a plurality of set screws 36–39 butting against rods 27–30 and preventing relative motion between the rods and main body 19. For example, passage 40 extends from slot 32 (FIG. 3) to the outer circumference or edge 41 of main body 19. Rod 28 extends through passage 40 with set screw 37 extending into passage 40 having a bottom end abutting rod 28 and securing the rod in the passage. The inner end 42 of each rod is bent thereby further insuring that the rods do not become accidentally disengaged from main body 19. A bevelled entrance 43 is provided for each passage 40 to allow some movement of the rod relative to the edge 41 of the disc without incurring substantial stress build up within the rod.

Each of the rods 27–30 extend outwardly an equal distance from main body 19. As shown best in FIG. 2, the rods extend in a nonradial direction relative to the axis of rotation of main body 19. For example, the longitudinal axis 35 of rod 27 is offset to the side of the axis of rotation of main body 19 and in fact, in the embodiment shown in FIG. 2 is perpendicularly arranged with respect to radial 40 emanating from the axis of rotation. The embodiment shown in the drawing has a first pair of parallel rods 27 and 29 which extend in opposite outward directions from main body 19. The pair of rods 27 and 29 are perpendicularly arranged with respect to the second pair of parallel rods 28 and 30 which also extend in opposite outward directions.

A slicing cut force is provided by the rods initially impacting the upstanding grass since the rods extend in a nonradial direction relative to the axis of rotation. Force F (FIG. 5) is exerted on grass 58 by rod 27 with force F including an inwardly directed force vector $F_X$ allowing the rod to slice through the blade of grass. The main portion of each rod is located outwardly of main body 19 and advances toward the direction of rotation. For example, rod 27 is arranged at angle 50 relative to line 52 which is tangent to main body 19 at the point of intersection of the main body and rod 27. Line 52 is also tangent to the point of intersection between rod 27 and the circular direction 24 of rotation. Further, rod 27 is arranged at angle 51 with respect to tangent line 52. Angle 50 is less than angle 51 since rod 27 is located aft of the axis of rotation. Rod 27 is shown as initially being in position a in FIG. 4 and then subsequently moving to positions b and c as main body 19 rotates in the direction of arrow 24. Assuming a blade of grass is impacted by rod 27 when in position b, it will be seen that the force vector f moves from a completely forward direction shown in FIG. 4a to an angular direction shown in FIG. 4b. Main force F includes upon impact in position b an inwardly directed force vector or component $F_X$ which increases as the rod moves to position c as shown in FIG. 4c. The inward directed force vector $F_X$ reduces the outward normal movement of the cut grass and allows the cut grass to be impacted by the following rods 30, 29 and 28 as main body 19 rotates. In normal applications, it has been found that excellent results occur when main body 19 is rotated at approximately 3,000 RPM. The inwardly directed force vector $F_X$ thereby allows for the grass to be subsequently mulched as impacted by the following rods. Likewise, a slicing cutting force is applied to the blades of grass thereby achieving a quicker and easier cutting action as compared to a straight-through cut found in the prior devices which utilize radial cutting rods.

In the preferred embodiment, the main body was approximately four inches in diameter and one-half inch thick. In the same embodiment, the slots provided in the main body were ¼ inch wide and 1¼ inches long with the passages through which the rods extend being of ¼ inch diameter. The rods extended approximately six inches from the edge or periphery of the disc and approximately ½ inch into the disc or main body. In the same embodiment, the disc was produced from aluminum and the rods were approximately 1/16 inch in diameter.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A grass cutter and mulcher for a rotary lawn mower having a rotatable output drive shaft comprising:

a main body operatively associated with said shaft and rotatable therewith in a circle about a substantially vertical axis of rotation;

a plurality of flexible rods mounted fixedly to said main body to extend outwardly therefrom in a nonradial direction relative to said axis to provide a slicing cut force upon initial impact with upstanding grass and with said force including an inwardly directed force component;

each of said rods having a main portion located outwardly of said main body advancing toward said circular direction to provide an inwardly directed force vector on the upstanding grass reducing outward movement of cut grass and to allow following rods to contact and mulch the cut grass, each of said rods located aft of said axis of rotation intersecting said circle and forming a leading angle between each rod and a tangent to said circle whereat said rod intersects and a trailing angle between said tangent and said rod with said leading angle being less than said trailing angle, said rods being immovable relative to said main body except for flexing.

2. The grass cutter and mulcher of claim 1 wherein said rods each have a longitudinal axis arranged perpendicular to a radial extending from said axis of rotation.

3. The grass cutter and mulcher of claim 2 wherein said rods are cantileveredly mounted to said main body which includes a plurality of elongated holes each aligned with a longitudinal axis of said rods and extending along a line offset from said axis of rotation.

4. The grass cutter and mulcher of claim 3 wherein said main body has a flat configuration with a horizontal upper surface and a horizontal lower surface and with said rods located equidistant therebetween.

5. The grass cutter and mulcher of claim 4 wherein each of said rods have length with a constant cross section along said length.

6. The grass cutter and mulcher of claim 4 wherein said main body includes rod passages extending from said holes with said rods extending into said passages and exiting therefrom at the periphery of said main body.

7. The grass cutter and mulcher of claim 2 wherein said plurality of rods includes a first pair of parallel rods extending in opposite outward directions and a second pair of parallel rods extending in opposite outward directions and perpendicularly arranged with respect to said first pair.

8. The grass cutter and mulcher of claim 2 wherein said rods have circular cross sections.

9. The grass cutter and mulcher of claim 8 wherein said main body is a disc with said output shaft projecting centrally therethrough.

* * * * *